(12) United States Patent
Hong

(10) Patent No.: US 7,344,075 B2
(45) Date of Patent: Mar. 18, 2008

(54) SCANNING APPARATUS AND GUIDING MECHANISM THEREOF

(75) Inventor: Min-Wen Hong, Tainan Hsien (TW)

(73) Assignee: BENQ Corporation, Taoyuan (TW)

( * ) Notice: Subject to any disclaimer, the term of this patent is extended or adjusted under 35 U.S.C. 154(b) by 0 days.

(21) Appl. No.: 11/355,230

(22) Filed: Feb. 15, 2006

(65) Prior Publication Data

US 2006/0187501 A1    Aug. 24, 2006

(30) Foreign Application Priority Data

Feb. 22, 2005    (TW) .............................. 94105231 A

(51) Int. Cl.
*G06K 7/10*   (2006.01)

(52) U.S. Cl. ...................... 235/454; 235/462; 235/483; 358/474

(58) Field of Classification Search ................ 235/454, 235/462.14, 480, 475, 477, 478, 483, 485, 235/462; 358/474

See application file for complete search history.

(56) References Cited

U.S. PATENT DOCUMENTS

| | | | | |
|---|---|---|---|---|
| 4,781,067 A | * | 11/1988 | Cichanski | .................... 73/620 |
| 4,870,502 A | * | 9/1989 | Dreinhoff et al. | ............ 358/474 |
| 7,020,428 B2 | * | 3/2006 | Park et al. | ................... 399/360 |
| 2002/0089704 A1 | * | 7/2002 | Hsiao | .......................... 358/474 |
| 2005/0123327 A1 | * | 6/2005 | Tateishi et al. | .............. 399/325 |
| 2006/0022400 A1 | * | 2/2006 | Kawasaki et al. | ........... 271/227 |

* cited by examiner

*Primary Examiner*—Michael G. Lee
*Assistant Examiner*—Tuyen Kim Vo
(74) *Attorney, Agent, or Firm*—Ladas and Parry LLP

(57) ABSTRACT

A scanning apparatus comprises a light-pervious plate, an optical device, and a guiding mechanism. The light-pervious plate provides a plane for placing an object to be scanned. The optical device is disposed under the light-pervious plate for capturing the image of the object and transforms the image into the corresponding signal. The guiding mechanism further comprises a guide bar, a loading frame, and an elastic element. The guide bar is disposed in the scanning apparatus and provides a scanning path. The loading frame, including a guide slot, is assembled with the optical device. Since the guide slot coordinates the guide bar, the optical device is mounted to move along the scanning path. The elastic element, disposed within the guide slot, exerts an elastic force toward the guide bar to reduce the gap between the guide slot and the guide bar so that the optical device can get better image of the document.

15 Claims, 7 Drawing Sheets

SCANNING APPARATUS AND GUIDING MECHANISM THEREOF

BACKGROUND OF THE INVENTION (1) Field of the Invention

This invention relates to a scanning apparatus, in particular to a scanning apparatus able to reduce the vibration while scanning.

(2) Description of the Prior Art

Nowadays, a variety of business machines are becoming indispensable to the living of human beings. The tasks, such as the transmitting, duplicating, storing, or editing for various information of pictures, text documents, etc., are completed by various business machines. Yet before the data as mentioned are processed, images are scanned in advance and transformed into electrical signals so that data can be further processed.

At present, flatbed is the most popular scanner type. Please refer to FIG. 1A, a schematic of a well-known flatbed scanner. As shown in FIG. 1A., the outer covering of scanning device 1 is like a crate, usually comprising a glass pane and a case and holding a chest inside the covering for mounting various scanning elements. In the scanning device 1, the element for mainly performing scanning is the optical device 10, comprising a light source 101, a reflector 102, a lens 103, and an image sensor 104.

As a document is disposed on the glass pane of the scanning device 1 for scanning, the image to be scanned is placed facing downwards so that the light from the light source 101 may illuminate the text image. Part of the, light is reflected to the reflector 102, then to the lens 103 via a proper angle of reflection, and finally is focused on the image sensor 104. Subsequently, the different brightness of images is transformed into corresponding analog signals, either output directly or delivered to an AD/DA converter to be converted into digital signals for further processing.

In order that the scanning range of the optical device 10 may cover the whole document, it needs to be conducted by a guiding mechanism so that it can scan back and forth in the scanning device. Therefore, as shown in FIG. 1., the optical device 10 is disposed on the guide bar 11 via a loading frame 11 (not shown in the figure), stretching across both sides of the scanning device 1, and is able to move forwards and backwards by the power provided by a power source (not shown in the figure). Apparently, it leads to a significant impact on the quality of the image if the optical device 10 can move smoothly and stably on the guide bar 11 while scanning.

Please refer to FIG. 1B., a schematic of connection between the optic device 10 and a guiding mechanism, comprising a guide bar 11 and a loading frame 12.

The guide bar 11 provides a scanning path in X direction to guide the optical device 10 to move.

The load frame 12 can carry the optical device 10 to move on the guide bar 11. The optical device 10 is disposed above the loading frame 12. The guide slot 121 is below the loading frame 12. The loading frame 12 embraces the guide bar 11 by means of the guide slot 121.

The loading frame 12, driven by the power provided by a driver (not shown in the figure), can move forwards and backwards in the X direction along the surface of the guide bar 11.

The enlarged figure as shown is a lateral schematic for the embrace of the loading frame 12 and guide bar 11. In general, because inaccuracy between the loading frame 12 and the guide bar 11 occurrs during manufacture, both sizes of the loading frame 12 and the guide bar 11 can not meet completely. If the loading frame tightly attaches to the guide bar 11, this will lead to an over-large sliding friction, resulting in trivial abrasion, or yield a high temperature that induces variations. After designing the sizes of both and considering the tolerance, one will prevent the size of the guide bar 11 from being larger than that of the guide slot 121. This leads to a slightly larger opening of the guide slot 121 than that of guide bar 11.

Consequently, a slight gap S occurs between the guide slot 121 than that of guide bar 11. This gap S is liable to cause vibrations when the loading frame moves. This makes images blurred and distorted. More likely, as shown in FIG. 1C., the optical device 10 is not straight-vertically disposed on the guide bar 11, but with a slight offset (an angle a as shown in the figure), which makes image obtained tilt. All the above factors will seriously affect the final quality of images.

Therefore, any effort devoted to getting rid of the above shortcomings so as to improve the scanning stability for the optical device is definitely welcome to all the persons in the art.

SUMMARY OF THE INVENTION

The primary object of the present invention is to provide a scanning device with a guiding mechanism, carrying the optical device stably and reducing the possible vibrations occurred from the motion of the optical device.

In order to achieve the goal, the present invention discloses herein a scanning device with a guiding mechanism. It comprises a light-pervious plate, an optical device, and a guiding mechanism.

The light-pervious plate provides a plane for placing an object, such as a document.

The optical device, disposed below the light-pervious, captures the image of the object, and then transforms the image to corresponding electrical signals.

The guiding mechanism comprises a loading frame, a guide bar, and an elastic element. The guide bar provides a scanning path.

The loading frame, assembled to move with the optical device, having a guide slot. The loading frame employs the coordination of the guide slot and the guide bar to carry the optical device to move along the scanning path.

The elastic component, disposed inside the guide slot, exerts an elastic force toward the guide bar to reduce the gap between the guide slot and the guide bar, and mitigates the vibrations occurred while the loading frame is sliding along the guide bar. Accordingly, the optical device may move more stably so as to obtain images with better quality.

DESCRIPTION OF THE PREFERRED EMBODIMENTS

Figure 1A:
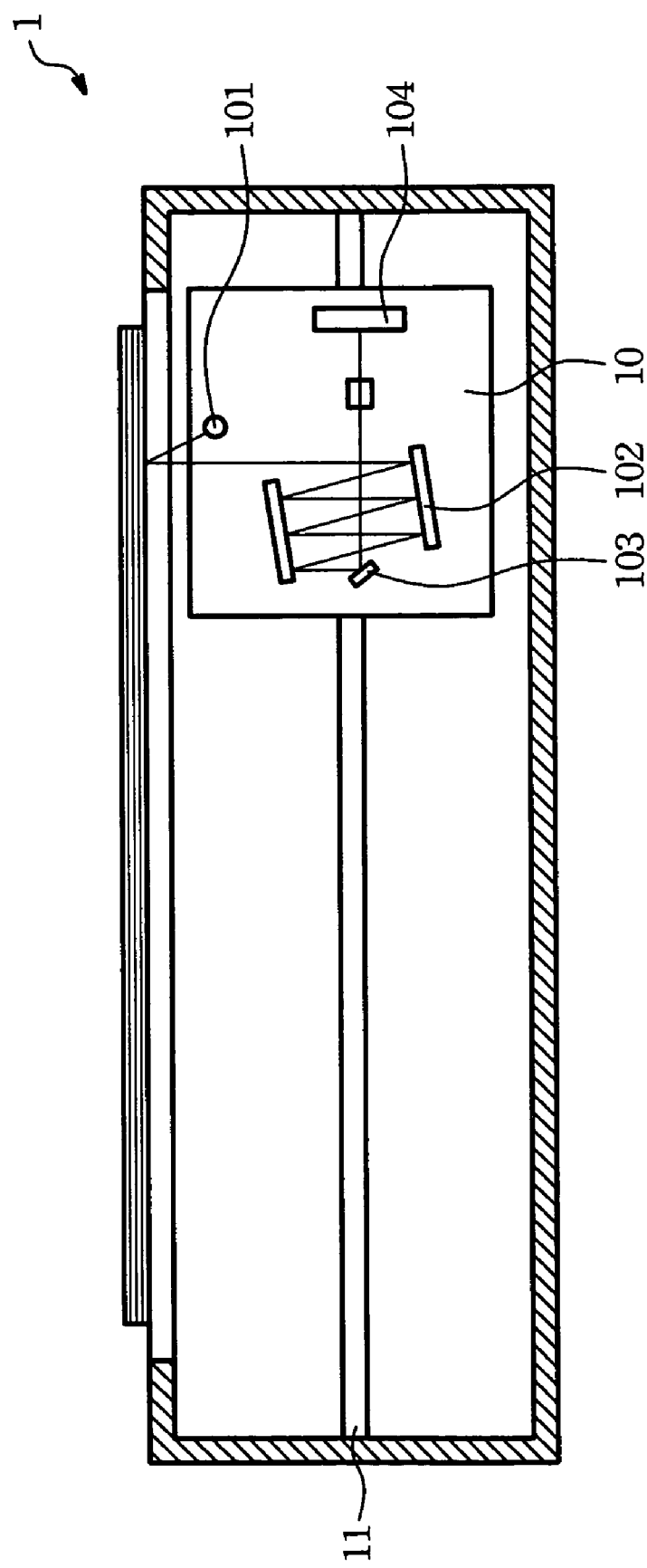
FIG. 1A, a schematic of a well-known flatbed scanning device.
Figure 1B:
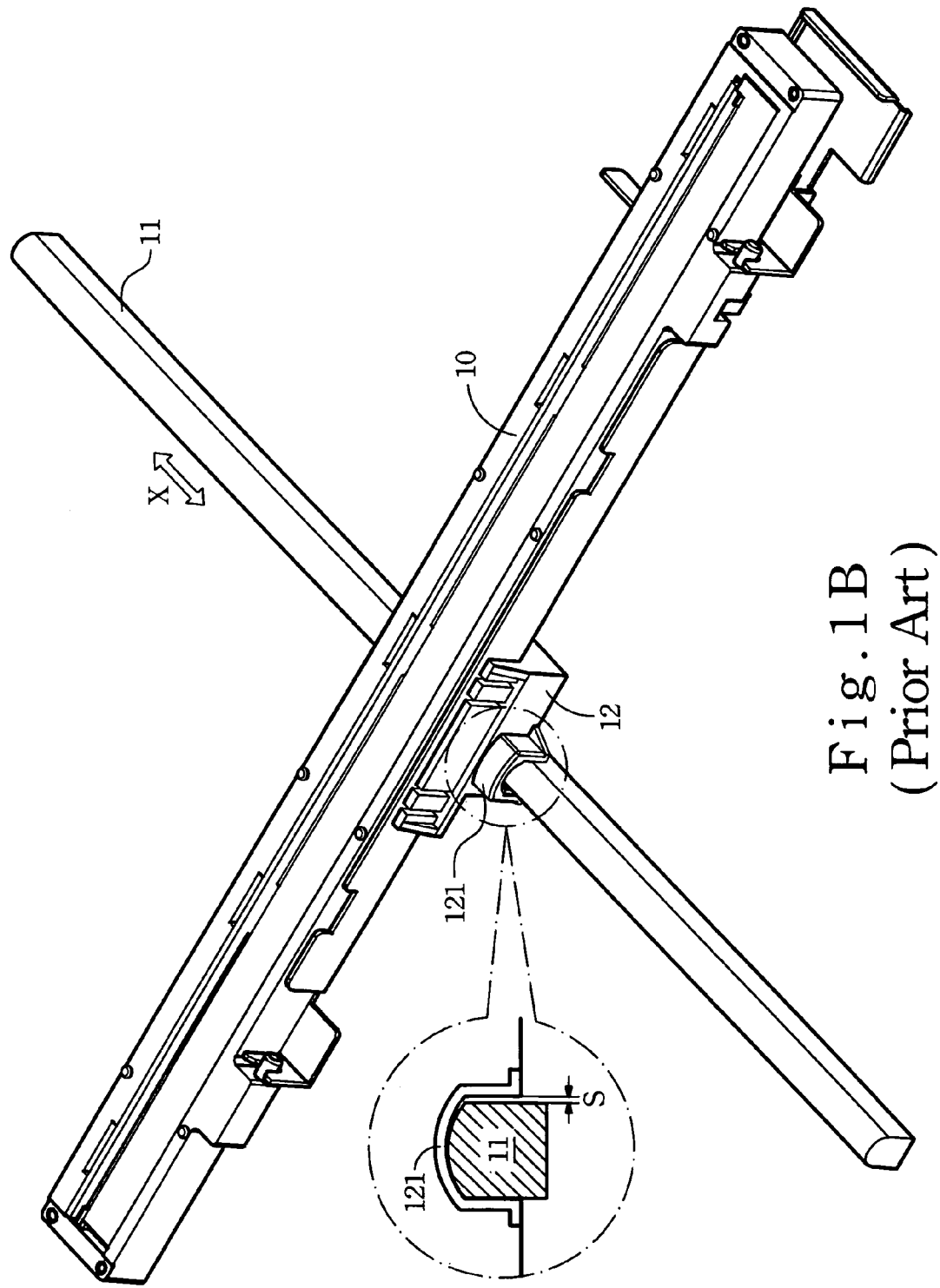
FIG. 1B, a schematic of the connection of an optical device and a guiding mechanism.
Figure 1C:
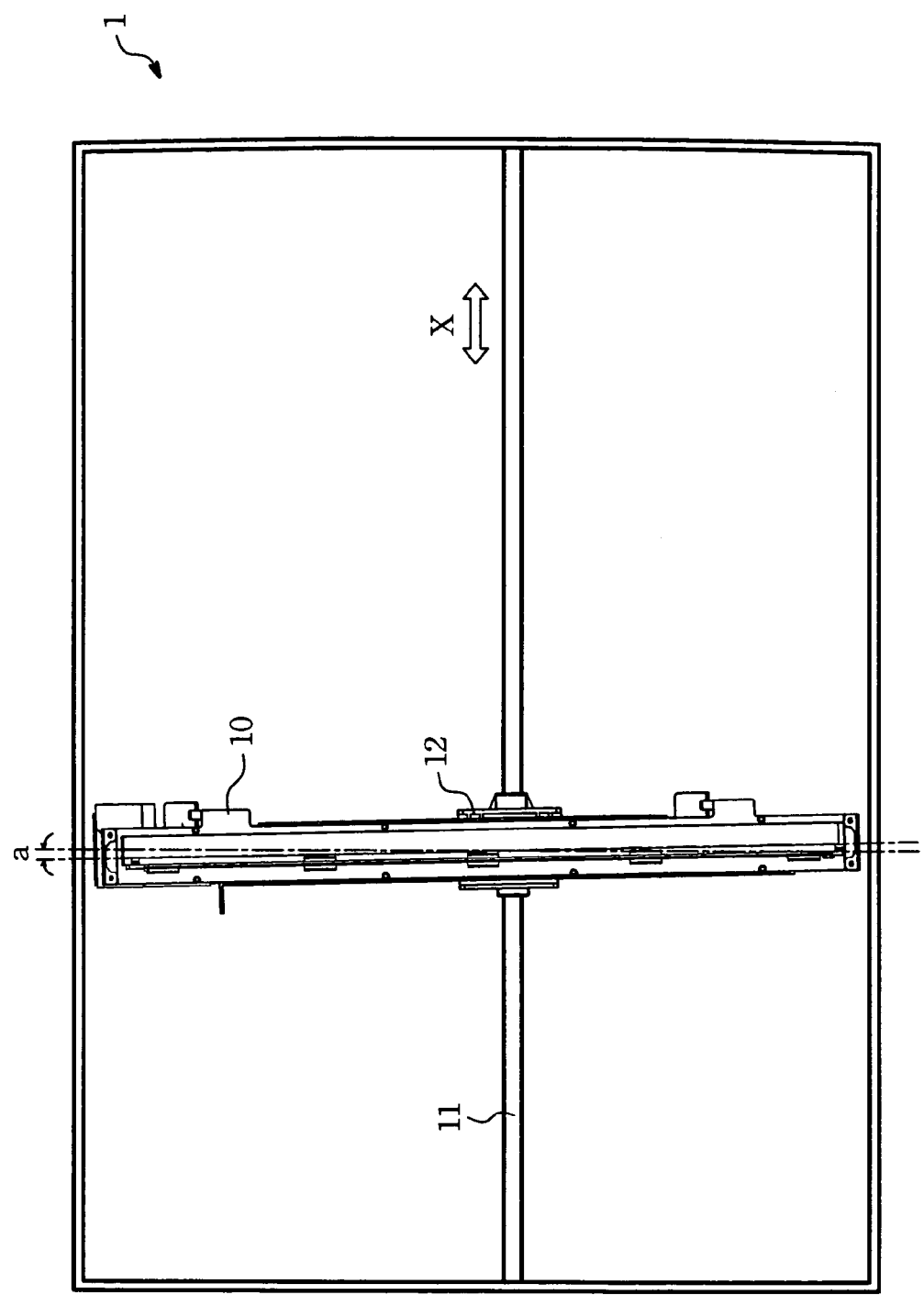
FIG. 1C., a schematic of a well-known flatbed scanning device.
Figure 2A:
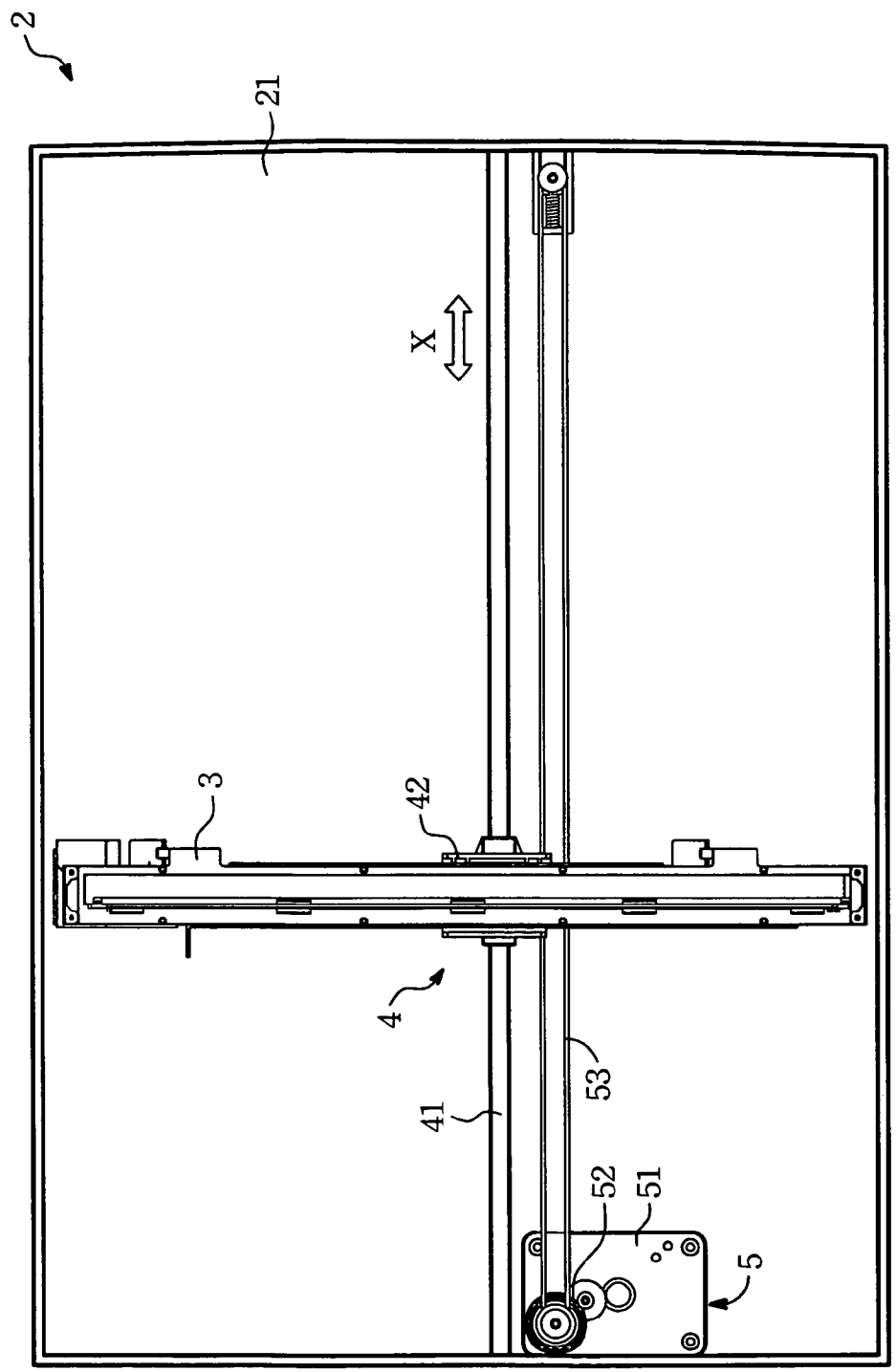
FIG. 2A., a schematic of an embodiment for the scanning device in this present invention.
Figure 2B:
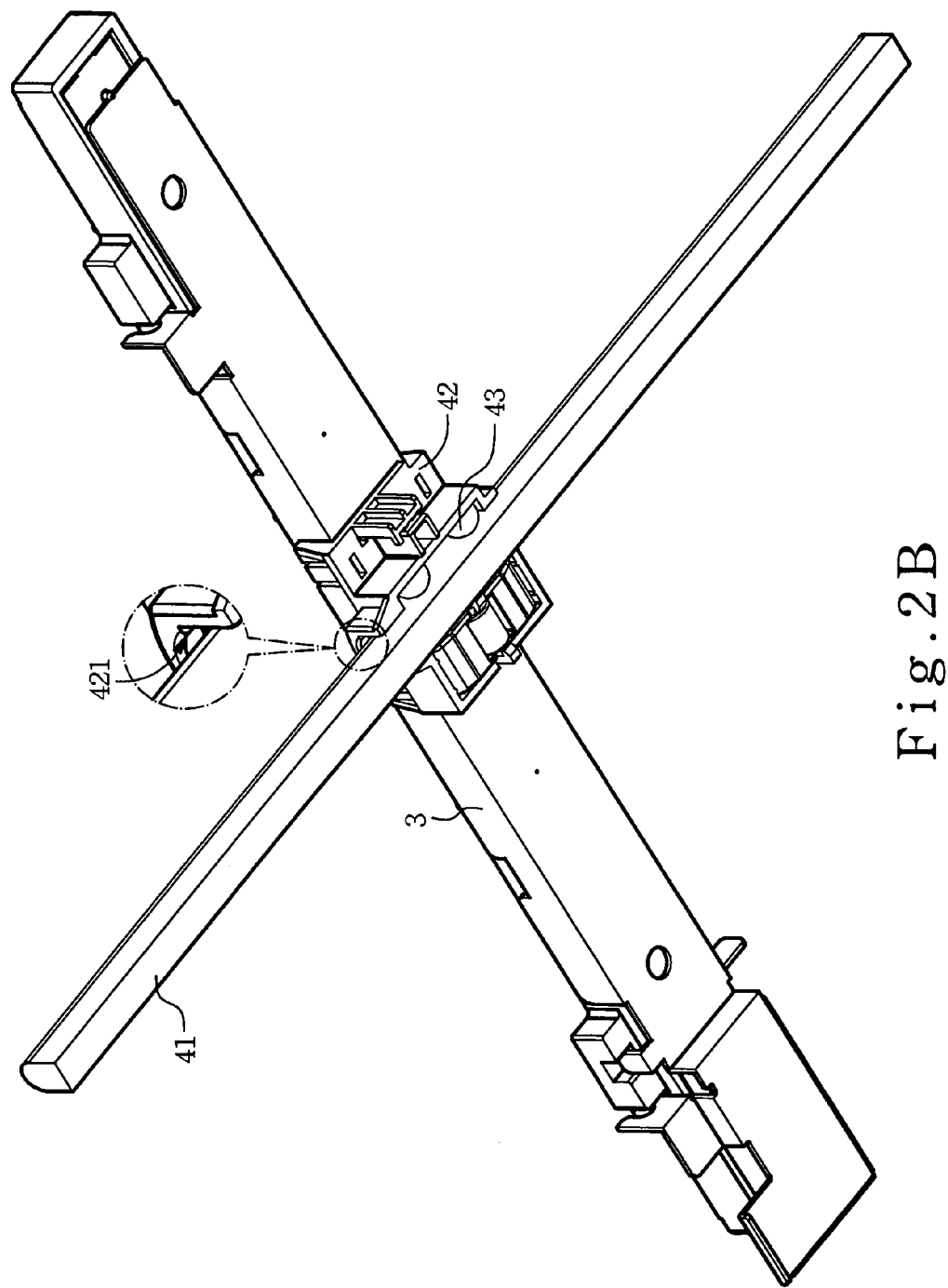
FIG. 2B., a schematic of the connection of the optical device and the guiding mechanism in the embodiment shown in FIG. 2A.

Please concurrently refer to FIG. 2A and FIG. 2B, which are the schematics for the embodiment of the scanning device with a guiding mechanism in this present invention. As shown in the figures, the scanning device 2 may be disposed in a variety of business machines, such as facsimile, copier, printer, and scanning devices, etc. The outside box of the scanning device 2 is composed of a light-pervious plate 21 and a rectangular case. The light-pervious plate, made of light-pervious material (such as glass), carries an object, like a document, for scanning on its upper surface. A cavity chest is formed in the rectangular case by placing the light-pervious plate 21 to cover the top of the rectangular case. The scanning device 2 is disposed inside the cavity chest so as to perform the scanning functions. For the advantage of understanding, each interior elements are shown in FIG. 2A.

In the present embodiment, the scanning device 2 comprises an optical device 3, a guiding mechanism 4, and a driver 5.

The optical device 3, disposed below the light-pervious 21, is composed of a linear CCD component and a light source. The linear CCD is arranged in perpendicular to the scanning path. After the light source sends out light to illuminate the image of documents, it is reflected into the linear CCD component with a proper reflected angle. The image of documents is transformed into corresponding analog signals.

The guiding mechanism 4 comprises a guide bar, a loading frame, and an elastic element 43 (please refer to FIG. 2B).

The guide bar 41, shaped as rectangular, is disposed inside the scanning device 2 and stretches across and exerts force on both sides of the scanning device 2. It provides the scanning path in X direction along which the optical device scans.

The loading frame 42, assembled with the optical device on its upper surface, is disposed at the center of the optical device 3 as a preferred embodiment. This leads to a better balance performance while the optical device 3 moves on the guide bar 41 by means of the loading frame 42. The guide slot 421 (please refer to FIG. 2B) is under the loading frame 42. The loading frame 42 embraces the guide bar 41 by means of the guide slot 421 to enable itself to slide on the guide bar 41. Under a preferred implementation, the shapes of junction areas between the guide slot 421 of the loading frame 42 and the guide bar 41 meet so as to obtain a close contact.

The elastic element 43 can be of any various types of elastic elements with deformation capability. It is located between one of the interior walls of the guide slot 421 and the surface of the guide bar 41 and tightly forwards to the surface of the guide bar 41. By means of the tension of the elastic force, the displacement of the guide bar 41 is restricted, so the guide bar 41 can steadily and tightly forward to another side of interior walls of the guide slot 421 to reduce the gap between the guide bar 41 and the guide slot 421. This leads to a more closer coordinated-condition between the guide bar 41 and the guide slot 421 so as to further improve the stability while the loading frame 42 is sliding on the guide bar 41.

The driver 5, linked to the loading frame 42, conducts the loading frame 42 to move along the direction guided by the guide bar 41. In this embodiment the driver 5 comprises a motor 51, a decelerated gear set 52, a belt 53. The motor 51, a step motor disposed at one end of the scanning device 2, employs the decelerated gear set 52 to transmit power so as to increase the output torsion. By means of the belt 53 to link both the decelerated gear set 52 and the loading frame 42, the motor 51 carries the belt 53 to move while it is running; further, the motor 51 synchronously conducts the loading frame 42 to move along the X direction guided by the guide bar 41 so as to drive the optical device 3. Certainly, other linkage methods or drivers can be used for the goal of driving the loading frame. They will not be detailed herein as redundancies.

To further explain the linkages of the optical device 3, the loading frame 42, the guide bar 41, and the elastic component 43, please refer the FIG. 2B. A schematic where the optical device 3 is disposed on the guide bar 41 in the embodiment shown in the FIG. 2A.

As mentioned earlier, the elastic element 43 can be of any type of various elastic elements with deformation capability. In this embodiment it consists of two protruding portions made of rubber, and is located between one interior wall of the guide slot 421 and a surface of the guide bar 41. The elastic element 43 forms a close contact with the surface of the guide bar 41. By means of the tension of the elastic force, the guide bar 41 also forms a close contact with the interior wall on the other side of the guide slot 421, so the gap between the guide bar 41 and the guide slot 421 is reduced.

Figure 3A:
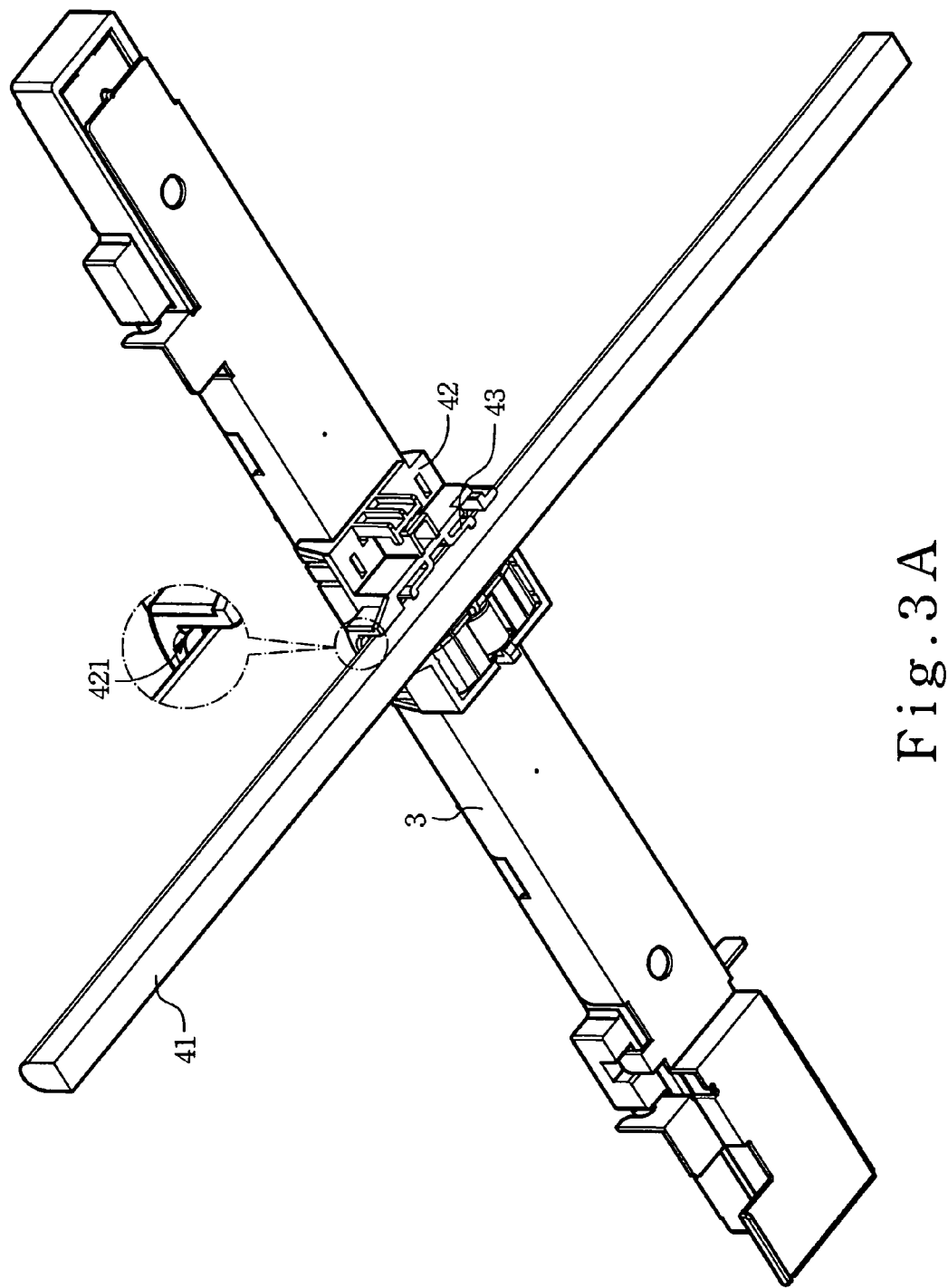
FIG. 3A., a schematic of the connection for a preferred embodiment in the present invention.

The elastic element 43 can be of any type of various elastic elements with deformation capability, such as cushions, rubbers with protruding portions, and springs, and so on. In a preferred embodiment, the elastic element 43 consists of two elastic beams, unified with the loading frame 42. Please refer to FIG. 3A. and FIG. 3B., a schematic of the elastic element 43 for a preferred embodiment in the present invention.

Figure 3B:
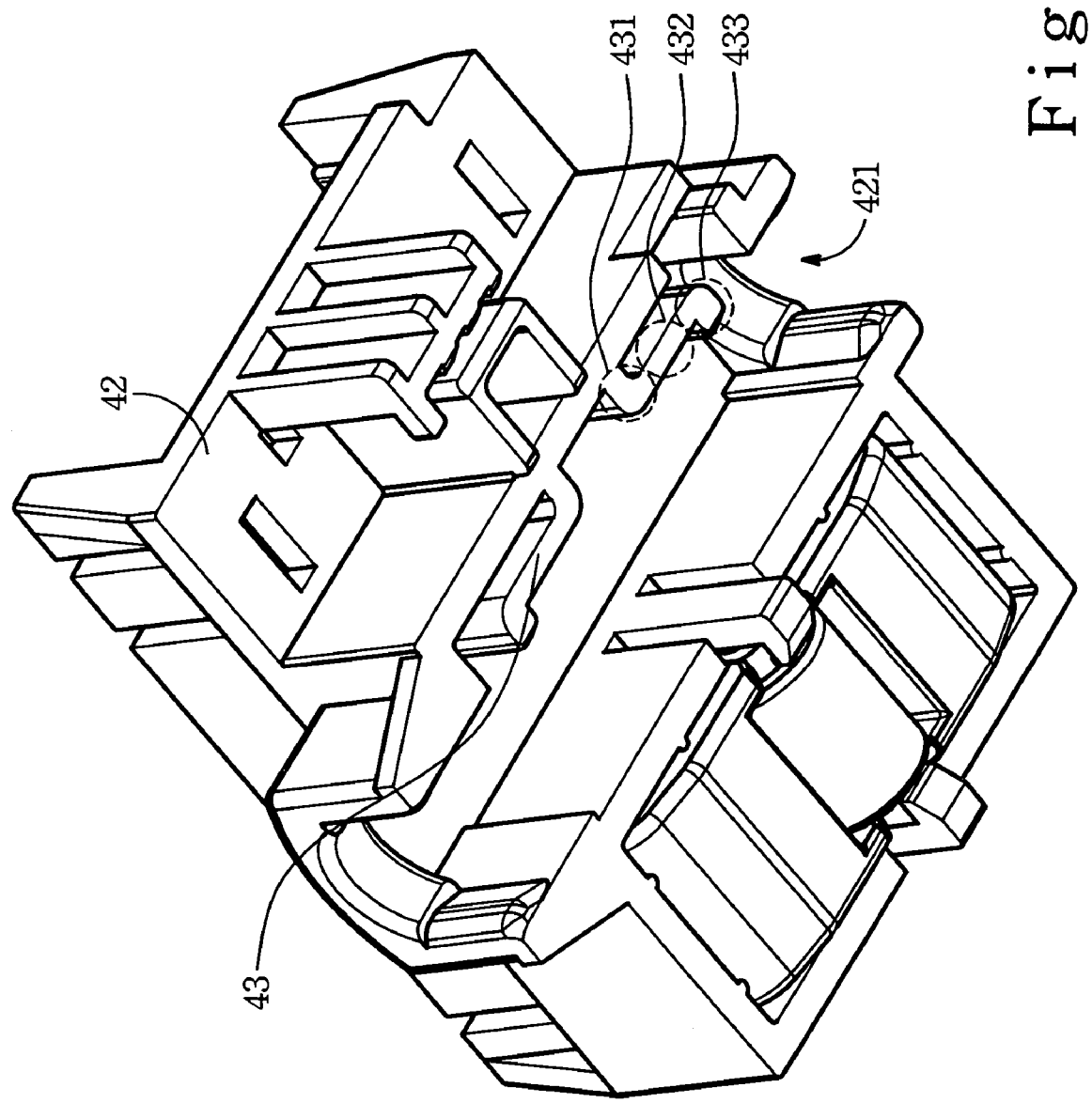
FIG. 3B., a schematic of the loading frame for the embodiment shown in FIG. 3A.

As shown in FIG. 3B, each elastic element 43 is slightly shaped like an "S". It can be distinguished by its location as the base 431, the suspending beam 432, and the end part 433. The base 431 is located at the side wall of the guide slot 421, stretches out to constitute a suspending beam 432, and points its end part 433 toward the surface of the guide bar 41. By means of an elastic force, the guide bar 41 is tightly forced to the guide slot 421 to reduce the gap between the guide bar 41 and the guide slot 421.

In addition, because the elastic beam employs the elastic force generated by its end part 433, the guide bar 41 is able to be in close contact with the guide slot. This embodiment enables the elastic beam to reduce the gap between the loading frame 42 and the guide bar 41 without having a large surface of the guide bar being in contact with the elastic element 43, since the guide bar receives a larger normal force only at the contact point with the end part 433. Therefore, while the loading frame 42 is sliding on the guide bar 41, it will not yield large friction to incur unnecessary erosion due to large contact area between the guide bar 41 and the elastic element 43. Moreover, a suitable lubricant may be added into the guide slot 421 and the elastic element 43 to reduce the friction occurred while the loading frame 42 is sliding on the guide bar 41 so as to decrease erosion.

Moreover, because the suspending beam 432 is not completely attached to the interior surface of the guide slot 421, this structure provides a vibration-absorption effect as a damper. Especially, when the motor starts or stops, the loading frame 42 is liable to generate a low-frequency vibration at this moment because of the change in acceleration. The elastic element 43 provides a buffer zone for the frame 42 when the frame vibrates, and allows the frame to reach stability faster.

As a comprehensive survey in the above embodiment, the present invention can reduce the gap between the loading frame 42 and the guide bar 41 by means of the elastic force from the elastic element 43 so that the vibration of the loading frame 42 is reduced while sliding. In addition, by means of the structure of the elastic beam in the preferred embodiment, this not only limits the friction force between the loading frame and the guide bar, but provides the vibration-absorption effect.

The embodiment above is to illustrate the invention in detail but not to give a specific embodiment. Any modification that doesn't exceed the essence of the invention should belong to this invention.

Thus the invention should be safeguarded according to the claims as follows.

I claim:

1. A scanning apparatus, comprising:
    a light-pervious plate, providing a plane for placing an object to be scanned;
    an optical device, disposed under the light-pervious plate for capturing an image of the object;
    a guide bar, providing a scanning path;
    a loading frame, assembled to move with the optical device, having a guide slot coordinated with the guide bar, so as to carry the optical device to move along the scanning path; and
    an elastic element, disposed within the guide slot, further including two elastic beams, each of which the elastic beam has an "S" shape further having thereof a base located at the guide slot, a suspending beam and an end part pointing toward the guide bar for exerting an elastic force to the guide bar to reduce the gap between the guide slot and the guide bar.

2. The scanning apparatus of claim 1, wherein a lubricant is used between the loading frame and the guide bar.

3. The scanning apparatus of claim 1, wherein the loading frame is disposed at the center of the optical device.

4. The scanning apparatus of claim 1, wherein the loading frame is driven by a step motor via a belt.

5. The scanning apparatus of claim 1, wherein the elastic element, comprising two protruding portions made of rubber material, is disposed within the interior wall of the guide slot and is wedged against the guide bar.

6. A scanning apparatus, comprising:
    a light-pervious plate;
    an optical device, disposed under the light-pervious plate for capturing an image;
    a guide bar, providing a scanning path;
    a loading frame, assembled to move with the optical device, having a guide slot coordinated with the guide bar, so as to carry the optical device along the scanning path,
    wherein an elastic element is disposed within the guide slot and further includes two elastic beams, each of which the elastic beam has an "S" shape further having thereof a base located at the guide slot, a suspending beam and an end part pointing toward the guide bar for exerting an elastic force toward the guide bar for reducing the gap between the guide slot and the guide bar.

7. The scanning apparatus of claim 6, wherein a lubricant is used at the interface between the loading frame and the guide bar.

8. The scanning apparatus of claim 6, wherein the loading frame is disposed at the center of the optical device.

9. The scanning apparatus of claim 6, wherein the loading frame is driven by a step motor via a belt.

10. The scanning apparatus of claim 6, wherein the elastic element, comprising two protruding portions made of rubber material, is disposed within the interior wall of the guide slot and is wedged against the guide bar.

11. A guiding mechanism, disposed within a scanning apparatus to guide the motion of an optical device, comprising:
    a guide bar; and
    a loading frame, including
    a guide slot, coordinated with the guide bar; and
    an elastic element positioned on one sidewall of the guide slot and tightly wedged to the surface of the guide bar for reducing vibration occurred when the loading frame is moving on the guide bar, further including two elastic beams, each of which the elastic beam has an "S" shape further having thereof a base located at the guide slot, a suspending beam and an end part pointing toward the guide bar for exerting an elastic force to the guide bar to reduce the gap between the guide slot and the guide bar.

12. The guiding mechanism of claim 11, wherein a lubricant is used at the interface between the loading frame and the guide bar.

13. The guiding mechanism of claim 11, wherein the loading frame is disposed at the center of the optical device.

14. The guiding mechanism of claim 11, wherein the loading frame is driven by a step motor via a belt.

15. The guiding mechanism of claim 11, wherein the elastic element, comprising two protruding portions made of rubber material, is disposed within the interior wall of the guide slot and is wedged against the guide bar.

* * * * *